(12) United States Patent
Edwards et al.

(10) Patent No.: US 12,410,019 B2
(45) Date of Patent: Sep. 9, 2025

(54) VISION AND CONTROL SYSTEMS FOR ROBOTIC PACK STATIONS

(71) Applicant: Plus One Robotics, Inc., San Antonio, TX (US)

(72) Inventors: Shaun Edwards, San Antion, TX (US); Paul Hvass, San Antonio, TX (US)

(73) Assignee: PLUS ONE ROBOTICS, INC., San Antonio, TX (US)

( * ) Notice: Subject to any disclaimer, the term of this patent is extended or adjusted under 35 U.S.C. 154(b) by 985 days.

(21) Appl. No.: 17/515,401

(22) Filed: Oct. 30, 2021

(65) Prior Publication Data

US 2023/0139689 A1    May 4, 2023

(51) Int. Cl.
    *B25J 9/16*    (2006.01)
    *B65G 47/91*   (2006.01)

(52) U.S. Cl.
    CPC .......... *B65G 47/917* (2013.01); *B25J 9/163* (2013.01); *B25J 9/1653* (2013.01); *B25J 9/1661* (2013.01); *B25J 9/1664* (2013.01); *B25J 9/1697* (2013.01); *B65G 2203/0216* (2013.01); *B65G 2203/0233* (2013.01); *B65G 2203/0283* (2013.01); *B65G 2203/041* (2013.01)

(58) Field of Classification Search
    CPC .......... B65G 47/917; B65G 2203/0216; B65G 2203/0233; B65G 2203/0283; B65G 2203/041; B25J 9/163; B25J 9/1653; B25J 9/1661; B25J 9/1664; B25J 9/1697; B25J 9/1687; G05B 2219/40006; G05B 2219/40607; G05B 2219/45063
    See application file for complete search history.

(56) References Cited

U.S. PATENT DOCUMENTS

| | | | |
|---|---|---|---|
| 9,600,798 B2* | 3/2017 | Battles | B25J 9/16 |
| 10,471,597 B1* | 11/2019 | Murphy | B25J 9/1674 |
| 10,773,891 B2 | 9/2020 | High et al. | |
| 10,954,067 B1* | 3/2021 | Theobald | B25J 19/022 |
| 11,142,399 B2* | 10/2021 | Ahmann | G05D 1/0225 |
| 11,436,753 B2 | 9/2022 | Haven et al. | |
| 11,453,129 B2 | 9/2022 | Paepcke et al. | |
| 2014/0180479 A1 | 6/2014 | Argue et al. | |
| 2015/0197009 A1 | 7/2015 | Melikian | |
| 2016/0167227 A1 | 6/2016 | Wellman et al. | |
| 2019/0039829 A1 | 2/2019 | High et al. | |
| 2019/0217477 A1 | 7/2019 | Paepcke et al. | |
| 2020/0095001 A1* | 3/2020 | Menon | B25J 9/0093 |
| 2020/0376668 A1 | 12/2020 | Russell | |
| 2023/0219237 A1* | 7/2023 | Galluzzo | B25J 13/006 700/245 |

FOREIGN PATENT DOCUMENTS

WO    2019143554 A1    7/2019

* cited by examiner

*Primary Examiner* — Robert T Nguyen
(74) *Attorney, Agent, or Firm* — Outlier Patent Attorneys, PLLC

(57) ABSTRACT

A vision system and control system for a robotic pack station is disclosed. Robotic pack stations typically include a work cell, which enables the transfer of items from a tote or a bin to a container. The work cell may include one or more of the following: a robotic arm, a vision system, a control system, a conveyor, and a pack platform. The vision system and control system of the present invention identify items and provide instructions to the robotic arm to pick and/or place items in a bin or a tote.

14 Claims, 7 Drawing Sheets

VISION AND CONTROL SYSTEMS FOR ROBOTIC PACK STATIONS

BACKGROUND

Field of Art

The present disclosure relates generally to robotic picking systems. More specifically, the present invention relates to a vision system for a robotic pack station.

Background

Robotic pack stations are specialized work cells that enable a robot to pick things from a tote, for example, and into a container. This approach enables a distribution center or a warehouse to fulfill orders by moving items and routing them from one place to another. Pack stations are typically comprised of a robotic arm, an end effector attached to the robotic arm, a work cell that houses and retains the robotic arm, a packing tote conveyor system that passes into the work cell and is configured to retain a packing tote, a pack platform connected with a take-away conveyor system for retaining boxes to be packed and for moving boxes that have been packed by the robotic pack station, a machine vision system that captures images of items contained in the packing tote, and a computing device for controlling and managing the various components in within the pack cell.

These systems, however, tend to have significant failure rates. For example, the robotic end effectors often end up picking incorrect items and/or the entire tote itself. Moreover, these systems can sometimes get in their own way and prevent efficient operations within the pack stations.

SUMMARY

The present invention overcomes some of the inefficiencies and challenges associated with traditional pack stations to improve efficiency and processes. The present invention, for example, enables the computing device that is associated with the pack station to enable automatic picks by leveraging artificial intelligence or machine learned models. Moreover, the present invention enables the routing of requests to a remote human reviewer who may intervene to deal with edge cases that the AI/ML based may not be able to deal with. The present invention also enables empty tote verification to ensure that empty totes are not picked or moved by the robotic arm and to ensure smooth operations.

More particularly, the present invention is for a computer-implemented method, system, and non-transitory computer medium for providing instructions to a robotic arm system in a work cell of a pack station, the instructions enabling the robotic arm to transfer items from a tote to a container, wherein the computer implemented method comprises: receiving an electronic signal associated with data acquisition system, the electronic signal identifying at least one of the tote, the container, and the items; sending a signal to the vision system to trigger a first pick, the first pick identifying at least one item in the tote and at least one pick point associated with the identified item in the tote, the pick point enabling at least a portion of the robotic arm system to at least one of pick and move the item; obtaining first pick trigger result data from the vision system; analyzing the first pick trigger result data; providing first pick instructions to the robotic arm, the first pick instructions enabling the robotic arm system to at least one of pick and move the item associated with the first pick trigger result data; providing first place instruction to the robotic arm system, the first place instructions identifying a location for placing the item associated with the pick trigger result data; and verifying first placement.

The computer implemented method may further comprising sending a signal to the vision system to trigger a next pick after verifying first placement. In one embodiment, the computer implemented method may further comprise: sending a signal to the vision system to trigger a next pick, the next pick identifying at least one item in the tote and at least one pick point associated with the identified item in the tote, the pick point enabling at least a portion of the robotic arm system to at least one of pick and move the item; obtaining next pick trigger result data from the vision system; analyzing the next pick trigger result data; providing next pick instructions to the robotic arm, the next pick instructions enabling the robotic arm system to at least one of pick and move the item associated with the next pick trigger result data; providing next place instruction to the robotic arm system, the next place instructions identifying a location for placing the item associated with the pick trigger result data; and verifying the next placement.

The computer implemented method may further comprise sending instructions to a work cell to load tote into the work cell. The computer implemented method may further comprise sending instructions to the work cell to move an empty container into the workcell from conveyance. In one embodiment, the computer implemented method may further comprise sending instructions to a barcode scanner to scan a barcode on the container. In one embodiment, the signal to the vision system to trigger a first pick may cause the vision system to automatically identify pick points by applying a machine learned model. In one embodiment, the computer implemented method may further comprise sending instructions to the robotic arm system to move out of the field of view of the pick camera after pick points are received from the vision system. In one embodiment, analyzing the first pick trigger result data is comprised of: determining whether pick points are returned; and performing an empty tote verification if no pick points are returned.

The computer implemented method may further comprise sending a signal to the vision system to trigger a second pick causing the vision system to provide data to a human reviewer for obtaining second pick point data. In one embodiment, the empty tote verification is performed by determining whether the last pick was performed via remote user intervention and sensor data associated with the tote, wherein the tote is verified to be empty if the last pick was performed by a remote user intervention, and if sensor data provides that the tote moved during the picking process.

In accordance with an embodiment of the invention, a system is disclosed for providing instructions to a robotic arm system in a work cell of a pack station, the instructions enabling the robotic arm system to transfer items from a tote to a container, the system comprising: a work cell that houses and retains the robotic arm system, wherein the robotic arm system comprises an end effector attached to a robotic arm; a packing tote system that is configured to retain a tote; a pack platform for retaining containers to be packed and for moving boxes that have been packed by the robotic pack station; a data acquisition system that captures data associated with at least one of the tote, the container, and the items; and a computer having a processor, memory, and access to computer readable media; a computer program stored on non-transitory computer readable media, configured to: send a signal to the vision system to trigger a first pick, the first pick identifying at least one item in the tote and at least one pick point associated with the identified item in the tote, the pick point enabling at least a portion of the robotic arm system to at least one of pick and move the item; obtain first pick trigger result data from the vision system; analyze the first pick trigger result data; provide first pick instructions to the robotic arm, the first pick instructions enabling the robotic arm system to at least one of pick and move the item associated with the first pick trigger result data; provide first place instruction to the robotic arm system, the first place instructions identifying a location for placing the item associated with the pick trigger result data; and verify first placement.

In accordance with an embodiment, a non-transitory computer readable storage medium storing instructions is disclosed that (the instructions), when executed by at least one processor of a computing system, causes the computing system to: send a signal to the vision system to trigger a first pick, the first pick identifying at least one item in the tote and at least one pick point associated with the identified item in the tote, the pick point enabling at least a portion of the robotic arm system to at least one of pick and move the item; obtain first pick trigger result data from the vision system; analyze the first pick trigger result data; provide first pick instructions to the robotic arm, the first pick instructions enabling the robotic arm system to at least one of pick and move the item associated with the first pick trigger result data; provide first place instruction to the robotic arm system, the first place instructions identifying a location for placing the item associated with the pick trigger result data; and verify first placement.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION OF EMBODIMENTS

Figure 1:
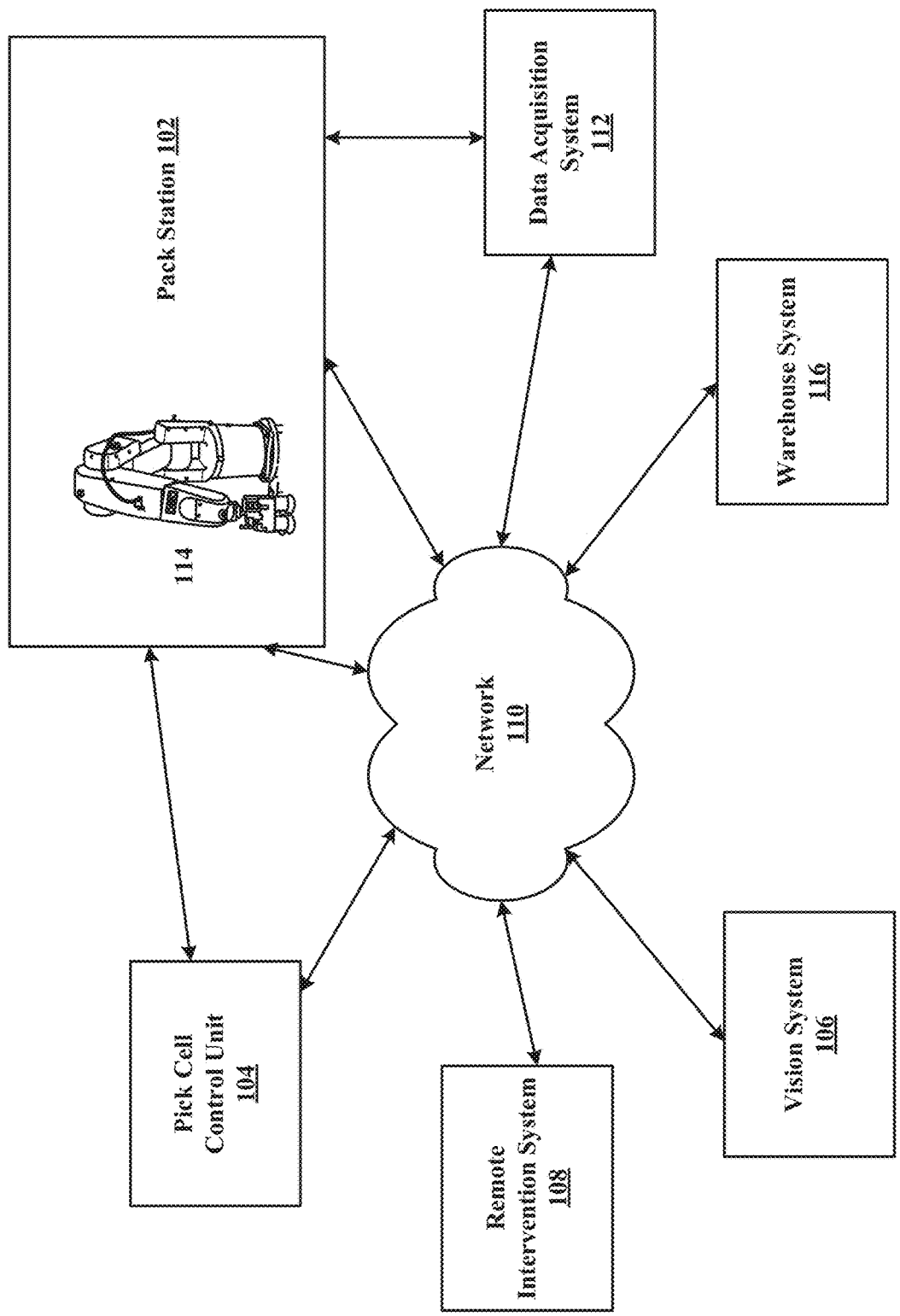
FIG. 1 is a diagram illustrating an example operating environment in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The present invention can be illustrated in various embodiments in addition to the embodiments described below. For instance, when the artificial intelligence (AI) within a smart camera system watching intersections to detect collisions between cars/bikes and pedestrians has low confidence in detecting such collisions, the AI may request human intervention. The AI may display a short video and/or an image within a graphical user interface and ask one or more humans whether a collision occurred or not. In another embodiment, automated path planners can create easy directions for humans to follow. The AI can check how easy the directions are by asking for humans to look at the directions and make any necessary changes. In an embodiment where manipulators try to attach two pieces together, the AI may request human intervention to assist in attaching the two pieces together. In another embodiment such as a speech to text system, the AI may request human intervention when it has difficulty understanding one or more words.

FIG. 1 illustrates a block diagram of an exemplary system for enabling improved robotic picking in a pick cell in accordance with certain aspects of the disclosure. The exemplary automatic robotic picking system 100 may include any number of computing devices that may be configured to pick up and/or move one or more objects. For example, as seen in FIG. 1, the system may be comprised of a pack station 102, a data acquisition system 112, a robotics system 114, pick cell control unit 104, a vision system 106, a remote intervention system 108, a warehouse system 116, and a network interface 110. In one embodiment, the data acquisition system 112, a robotics system 114, pick cell control unit 104, a vision system 106 may be a part of the pack station 102. The various computing devices described herein in connection with FIG. 1 are exemplary and for illustration purposes only. The system may be reorganized or consolidated, as understood by a person of ordinary skill in the art, to perform the same tasks on one or more other servers or computing devices without departing from the scope of the invention.

The pack station 102 may be comprised of a work cell that houses the robotic system 114 (including, for example, a robotic arm), a pick cell (i.e. a first cell and/or a pick side), and place cell (i.e. a second cell and/or a place side). In one configuration, the work cell portion of the pack station 102 interfaces with the robotic system 114 to pick/move items from a pick cell or pick side to a place cell or a place side portion of the pack station 102. The pack side and/or place side may be comprised of a variety of different configurations. For example, the pick side and/or place side may be comprised of a conveyor belt, a tote, a box, a pallet, an autonomous mobile robot, a put-wall (including, for example, a shelf with multiple boxes open on both side in which the robot can place items into one or more open sides, etc.). A variety of different to and from configurations are disclosed herein without limitation, including, moving items from a tote to a box, pallet to a conveyor, tote to tote, tote to autonomous mobile robot, conveyor to autonomous mobile robot, autonomous mobile robot to conveyor, autonomous mobile robot to tote, tote to put-wall, a tote to a plurality of containers, a plurality of totes to a container, a plurality of totes to a plurality of containers, etc.

In one embodiment, the pack station 102 is comprised of at least one sensor on a conveyor associated with the pick side and/or the place side. If a picking tote and/or a placement container is identified as travelling on the conveyor by the sensor, then the pack station 102 may provide instructions to push or place the identified tote or container onto either the pick or place side of the cell. In one embodiment, the same sensor or other sensors may be used to measure the size of the box, which provides additional ability to optimize the pick and place process.

In one embodiment, the data acquisition system and/or robotic arm system is movable. This enables the data acquisition system and/or the robotic arm system to move if the robotic arm system is blocking the field of view of the data acquisition systems. For example, if a robotic end effector is in front of a camera used to capture images of the picking tote, then the camera and/or the robotic end effector may be moved to enable the camera's field of view to be unencumbered from the robotic end effector (or other items that may block the camera's field of view).

The robotic system 114 may be comprised of a robotic arm and an end effector attached to the robotic arm. Further, in one embodiment, the end effector may be comprised of one or more suction cups and a mechanism to apply negative pressure or vacuum via the suction cup to enable the suction cup to temporarily attach to an object while the negative pressure is being applied. In one embodiment, the suction cups may be extendible. In other embodiments, other robotics systems 114 may be used, as would be apparent to a person of ordinary skill in the art, without departing from the scope of the invention, including singulation systems, etc. Moreover, a variety of different end effectors may be used without departing from the scope of the invention, including, but not limited to other types of grippers, manipulation systems, etc.

The data acquisition system 112 captures data associated with the pack station 102 and/or data associated with objects or boxes placed within the pack station 102 (including, for example, the first side and/or the second side of the pick cell). In one embodiment, the data acquisition system 112 may be integrated into the pack station 102. In other embodiments, the data acquisition system 112 may be separate from the pack station 102 but nevertheless may capture data associated with one or more portions of the pack station 102 including a first portion of the pack station 102 (hereinafter also referred to as a pick side or first side) as well as a second portion of the pack station 102 (hereinafter also referred to as a place side or second side).

By way of example and not limitation, the data acquisition system 112 may include a 2-D camera system, a 3-D camera system and/or a ID scanner, etc., which are configured to capture data associated with the first side and/or the second side and/or objects therein. The data acquired by the 2-D camera system and/or the 3-D camera system may be referred to as 2-D image data and/or 3-D image data. In one embodiment, the identifier (ID) scanner may be comprised of a barcode scanner that is configured to scan, for example, a barcode or other types of identifiers that may be associated with a first container (i.e. a pick tote, pallet, etc.) and/or a second container (i.e. a placement box, etc.). In other embodiments, the ID scanner may be able to scan, for example, a barcode or other types of identifier that may be placed on the one or more items in a first container and/or second container. As explained in more detail, the identifiers associated with a first and/or a second container may be used to retrieve data about items that are in the container. For example, a warehouse system 116 may pack a first container and may store information about the items in the container in a database. An identifier that enables access to that database entry may be used by the data acquisition system 112 to verify information obtained from other sources, including, for example, the imaging system, the robotics system 114, etc.

Figure 3:
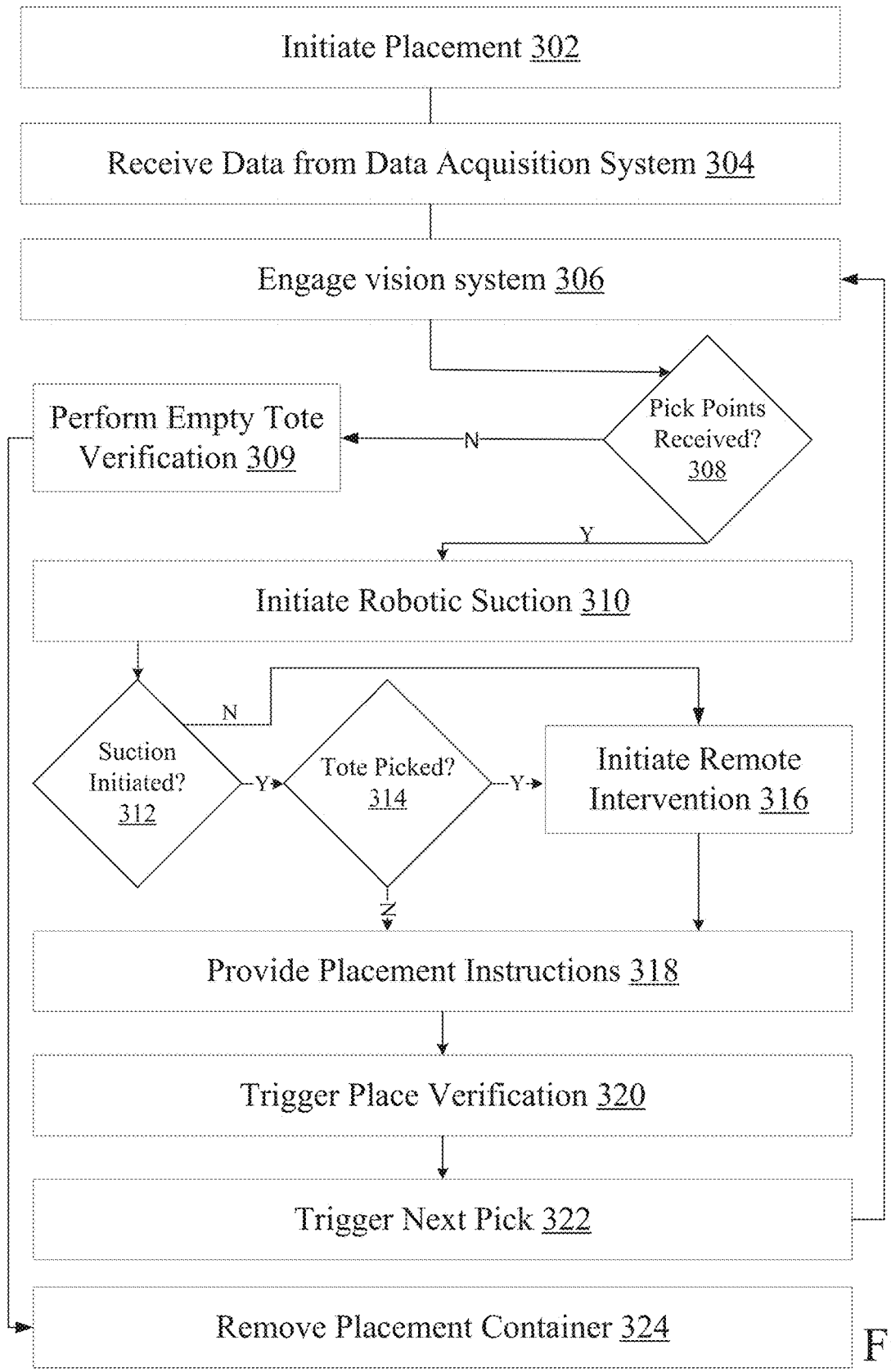
FIG. 3 is a process diagram for controlling a pack station in accordance with certain aspects of the disclosure.

The pick cell control unit 104 enables the operation of the various elements to enable the robotic system 114 to move items from one place within the pack station 102 to another place within the pack station 102 (i.e. from a pick side to a place side). More specifically, as illustrated in FIG. 3, the pick cell control until 104 interfaces and coordinates with the various other systems and subsystems that are illustrated in FIG. 1 (i.e. the robotic picking system 100) to ensure that items are move from a first position to a second position in an efficient manner with low or minimal errors. For example, in one embodiment, the pick cell control unit 104 interfaces with the pack station 102 to move a first container to the pick side and a second container to the place side.

The pick cell control unit 104 may also interface with the data acquisition system 112 to capture information about the pack station 102 and/or the objects that may be placed within one or more containers within the pick cell. In addition, the pick cell control unit 104 may interface with the vision system 106 to identify pick points for picking one or more objects within a first container, for example. The pick control unit 104 may also interface with the remote intervention system 108 to enable a remote human-in-the-loop operator to intervene in a timely manner and before any system breakdowns occur. The pick cell control unit 104 also interfaces with the robotics system 114 to pick objects from the first container (based on pick points identified by the vision system 106) and into the second container based on instructions provided by the vision system 106 and/or the remote intervention system 108.

The vision system 106, in accordance with an embodiment of the invention, obtains data from the data acquisition system 112, processes the data, and outputs pick points for picking one or more objects in the pack station 102. A variety of different pick point selection methodologies may be used without departing from the scope of the invention, including, but not limited to boundary detection, AI systems, etc.

In one exemplary configuration, the vision system 106 may obtain data (e.g., a 2-D or 3-D image) from the data acquisition system 112. The image data may be of the picking cell, e.g., such as objects and/or structures that are a part of the picking cell and/or portions of the picking cell including, for example, the first side and/or the second side as well as objects located on or within the first side and/or the second side. In one embodiment, the vision system 106 may identify objects in the field of view of one or more cameras in the data acquisition system 112 that may be occluding the camera's field of view. In that scenario, the vision system 106 may interface with the pick cell control unit 104 to move the object (including, for example, a robotic arm and/or a portion thereof) from the camera's field of view.

In certain implementations, the vision system 106 may identify each object depicted in the data obtained from the data acquisition system 112 and may compute a pick point for each identified object. A variety of different identification factors may be used without departing from the scope of the invention, including, but not limited to shape, edges, boundaries, color, texture, shadow, distance, etc. Upon identifying each object depicted in the image, the vision system 106 may identify a set of pick point selection factors associated with each object by applying an algorithm developed based on the training model in the first dataset and/or the second dataset. A variety of different training models may be used, as would be known to persons of ordinary skill in the art without departing from the scope of the invention, including, but not limited to, Markov Models, Random Walk Models, etc. In some embodiments, the dataset may include, for example, a lookup table that correlates different sets of pick point selection factors (e.g., height, position, angle, surface area, shape, volume, color, texture, shadows, obfuscation, etc.) with potential pick points. In one instance, the vision system 106 may access the first dataset or second dataset maintained by a training system. The vision system 106 may find the object's identified set of pick point selection factor (s) maintained in the lookup table and/or in an algorithm that is generated from the training model in order to determine the corresponding pick point for the object. In an example implementation, the training system may maintain a first dataset (e.g., an initial training model) for cubic objects only. Here, the initial dataset may correlate a top surface area of X square meters to a pick point of X square inches positioned around the center point of the top surface area of an object. Using this example, if the top surface area of object A is 4 square meters, the vision system 106 may select and/or identify a pick point of 8 square inches around the center point of object A's top surface.

In one embodiment, the vision system 106 may communicate with the robotics system 114 and/or the pick cell control unit 104 to pick one or objects based on the computed pick points. For example, the vision system 106 may instruct the pick cell control unit 104 to manipulate the robotics system 114 to pick object A using an 8 inches squared pick point centered around the center point of object A's top surface. In some embodiments, a signal indicating the selected pick point along with image data associated with object A may be sent to the training system. In certain configurations, the training system may update the first dataset (e.g., generate a second dataset) to include information associated with the selected pick point and image data for object A. Additionally and/or alternatively, the robotics system 114 and/or the pick cell control unit 104 may send a signal indicating whether object A was successfully picked up using the selected pick point to the training system. The training system may generate the second dataset by including a datapoint that indicates whether the robotics system 114 successfully picked object A using the selected pick point.

In instances when the vision system 106 is unable to select a pick point for an object, the vision system 106 may send data associated with the object to the remote intervention system 108. The remote intervention system enables a human-in-the-loop operator to manually pick points associated with an object. In one embodiment, the remote intervention system translates the user selection into pick points that may be provided to the pick cell control unit 104 and/or the robotics system 114. For example, if the lookup table only includes pick points for cubic objects, and the vision system 106 identifies an object as spherical, a signal may be sent to the remote intervention system 108 requesting that a human-in-the-loop user select a pick point for object B.

The warehouse system 116 may store information about items in a container in a database. An identifier that enables access to that database entry may be used by the data acquisition system 112 to verify information obtained from other sources, including, for example, the vision system, the robotics system 114, etc. In one embodiment, each container on the pick side and/or the place side is associated with a barcode. The contents of each container, as well as data associated with the container may be tracked by the warehouse system 116.

The network 110 may be comprised of systems and logic for enabling communication among various electronic devices which may or may not have been illustrated here. Communications, for example, within the example operating environment may be implemented using a wireless communication protocol (e.g., FlashLinQ, WiMedia, Bluetooth®, ZigBee®, Wi-Fi based on the IEEE 802.11 standard, Long-Term Evolution (LTE), or 5G New Radio (NR), narrowband internet-of-things (NB IoT), etc.), a mix of different wireless communication protocols, an internet protocol, a wired communication protocol, or any combination thereof. In certain configurations, the network 112 may comprise any one or combination of a wired network, a wireless wide area network (WWAN), a wireless local area network (WLAN), or a wireless personal area network (WPAN). In certain configurations, at least a portion of the network 110 may be private. In certain other configurations, at least a portion of the network 110 may be public, e.g., such as the Internet.

The automatic robotics picking system 100 illustrated in FIG. 1 may be configured to, among other things, pick up and move one or more object(s), e.g., using the techniques set forth below.

In certain implementations, the pick cell control unit 104 and/or the intervention system 108 may initiate and/or coordinate operations performed by any combination of systems disclosed herein. By way of example and not limitation, the cell control unit 104 and/or the intervention system 108 may be associated with initiating and/or performing operations used to move one or more objects that are located in a region accessible to the robotics system 114. The region accessible to the robotics system 114 may be referred to as, e.g., a picking cell, which may be comprised of one or more areas and/or sides. The picking cell may be comprised of, e.g., a pick side and a place side. The pick side of the picking cell may be the region into which the object(s) are initially loaded before being transferred to the place side, e.g., by the robotics system 114. In certain implementations, the cell control unit 104 and/or the intervention system 108 may instruct the loading system to load the one or more objects into the pick side of the picking cell. In certain non-limiting configurations, the cell control unit 104 and/or the intervention system 108 may instruct the loading system to load an apparatus into the place side of the picking cell. The apparatus loaded into the place side of the picking cell may be configured to maintain and/or support the object(s) being moved from the pick side of the picking cell by the robotics system 114. By moving the object(s) from the pick side to the place side, the object(s) may be sorted or grouped in a particular manner, e.g., in a manner useful for packing or shipping.

The loading system may include one or more devices and/or mechanisms configured to load object(s) into the pick side of the picking cell and/or configured to load apparatus (es) into the place side of the picking cell.

By way of example and not limitation, the loading system may include, e.g., a robot, robotics system 114, a conveyor, an autonomous mobile robot (AMR), or any type of moving surface and/or apparatus that is able to load object(s) into the pick side of the picking cell and/or apparatuses into the place side of the picking cells into the pick side. In certain configurations, the object(s) may rest on a first support structure when loaded into the pick side of the picking cell. The first support structure may be part of the loading system 104 or separate from the loading system 104. The first support structure may include, e.g., a first stationary support structure, a first moving support structure, or a combination of the two. The object(s) may be moved (e.g., by the robotics system 114) from the first support structure to a second support structure that is loaded into the place side of the picking cell. The second support structure that loaded into the place side of the picking cell may include, e.g., a second stationary support structure, a second moving support structure, or a combination of the two.

With reference to loading object(s) into the pick side of the picking cell, the first stationary support structure may be stationary in that it is loads a group of objects into the pick side of the picking cell, concurrently, and remains stationary until some or all of the objects have been offloaded therefrom. After some or all of the object(s) are moved outside of the pick side by the robotics system 114, the loading system may remove the empty first stationary support structure from the pick side of the picking cell before the loading process begins again for a different group of one or more object(s). By way of example and not limitation, the first stationary support structure may include, e.g., a container, a box, a tote, a pallet, or any type of surface or mechanism that is able to maintain, hold, or support one or more objects therein and/or thereon and loaded into the pick side of the picking cell.

On the other hand, the first moving support structure (e.g., associated with the pick side of the picking cell) may be moving in that it loads the one or more objects into the pick side of the picking cell one at a time and/or a batch basis until all of the objects have been moved to the place side of the picking cell. As example and not by way of limitation, the first moving support structure may include, e.g., a conveyor, an autonomous mobile robot (AMR), or any type of moving surface and/or apparatus that is able to load objects into the pick side one at a time and/or batch basis. For example, the conveyor may move a single object into the pick side of the picking cell and stop. Once the object has been moved by the robot, the conveyor may move the next object into the pick side of the picking cell, and so on.

With reference to the objects being moved to the place side of the picking cell, the second stationary support structure may be stationary in that it does not move until all of the objects have been moved (e.g., by the robotics system 114) into the place side of the picking cell from the pick side of the picking cell. Once all of the object(s) are loaded onto the second stationary support structure, the loading system may remove the second stationary support structure with the object(s) from the pick side of the picking cell before the loading process begins again for a different group of object (s). By way of example and not limitation, the second stationary support structure may include, e.g., a container, a box, a tote, a pallet, or any type of surface that is able to maintain, hold, or support one or more objects therein and/or thereon when moved and/or loaded into the pick side of the picking cell.

On the other hand, the second moving support structure may be moving in that it moves the objects out of the pick side of the picking cell one at a time and/or a batch basis until all of the objects have been moved from the pick side to the place side. As example and not by way of limitation, the second moving support structure may include, e.g., a conveyor, an autonomous mobile robot (AMR), or any type of moving surface and/or apparatus that is able to move objects into the pick side one at a time and/or batch basis. For example, the conveyor may move a single object outside of the picking cell once the object has been placed onto the conveyor. Once moved, the conveyor may stop and wait for the next object, and so on.

Once the loading processes for the first and second support structures into the picking cell is complete, the cell control unit 104 and/or the intervention system 108 may instruct the computer-vision system 106 to obtain placement information associated with the object(s), the first support structure, and/or the second support structure that is loaded into the picking cell by the loading system.

In certain implementations, the 2-D image data and/or 3-D image data may be sent to the cell control unit 104 and/or the intervention system 108, which may use the image data to determine proper placement of the object(s), first support structure, and/or second support structure loaded into the picking cell. In certain non-limiting examples, the cell control unit 104 and/or the intervention system 108 may determine whether the object(s), first support structure, and/or second support structure is/are situated within their respective predetermined area(s) associated with proper placement in the picking cell. For example, the control/intervention system 102 may compare the 2-D image data and/or 3-D image data to preconfigured information associated with the predetermined area(s) associated with proper placement of the object(s), first support structure, and/or second support structure in order to determine proper placement.

In certain implementations, a sensor system may be used to determine proper placement of the object(s), first support structure, and/or second support structure within the picking cell. The sensor system may include, for example, one or more sensors configured to capture sensor data associated with the object(s), first support structure, and/or second support structure loaded into the picking cell. By way of example and not limitation, the sensor system may include an optical sensor system, a pressure sensor system, a laser sensor system, a weight sensor system, or any other sensor system that may be configured to obtain sensor data related to the placement of the object(s), first support structure, and/or second support structure within the picking cell.

In certain implementations, the sensor system may send the sensor data to the cell control unit 104 and/or the intervention system 108, which may use the sensor data to verify proper placement of the object(s), first support structure, and/or second support structure within the picking cell. In certain non-limiting examples, sensor data may be used to verify whether the object(s), first support structure, and/or second support structure within the picking cell is/are situated within a predetermined area associated with proper placement. For example, the sensor data may be compared to preconfigured information that correlates sensor data in order to verify whether the object(s), first support structure, and/or second support structure are properly positioned within the picking cell. For example, when the comparison of the sensor data to the preconfigured information indicates that the object(s), first support structure, and/or second support structure are located within their respective predetermined areas within the picking cell, then proper placement may be verified. Once verification is performed, a signal may be sent to the cell control unit 104 and/or the intervention system 108 to indicate whether proper placement of the object(s), first support structure, and/or second support structure is verified. If proper placement is not verified instructions may be sent to the robotics system 114 to reposition whichever of the object(s), first support structure, and/or second support structure is not identified as being properly positioned within the picking cell and/or recognized as being improperly positioned. Once repositioned, the verification process using the operations described above in connection with the computer-vision system 106, the sensor system, and the verification system may be repeated to verify whether the repositioned object(s), first support structure, and/or second support structure are now properly positioned within the picking cell. Once the proper positioning of the object(s), first support structure, and second support structure is verified, the various systems described herein may be used to verify that the computer-vision system 106 has a the field-of-vision (FOV) of the picking cell (e.g., of the object(s), first support structure, and the second support structure) that is unobstructed by the loading system 104 and/or robotics system 114. When the FOV is clear, the cell control unit 104 and/or the intervention system 108 may instruct computer-vision system 106 to obtain image data of the picking cell and send the image data to a robotics AI engine, which then selects pick points for one or more of the object(s) (e.g., located in the pick side of the picking cell) based at least in part on the image data.

Upon verification that the last object was picked, the computer-vision system 106 and/or the cell control unit 104 and/or the intervention system 108 may send the image data to the verification system 120 and request empty first support structure verification. When the verification system does not verify that the first support structure is empty, the remote intervention system 108 may alert a user to intervene and select a pick point for any objects remaining in the pick side. Otherwise, when the empty first support structure verification is successful, the control/intervention system 102 may instruct the robotics system 114 to remove the first support structure from the pick side of the picking cell and the second support structure from the place side of the picking cell. For example, the empty tote from the pick side of the picking cell may be removed, and the box full of objects may be moved from the place side of the picking cell.

Sensors may be configured to identify if one or more of the object(s), first support structure, and/or the second support structure shifts outside of proper placement within the picking cell during any of the operations described in connection with FIG. 1. A signal may be sent to the control/intervention system 102 indicating that one or more of the object(s), first support structure, and/or the second support structure has shifted outside of their respective initial position. The computer-assisted user-intervention system 116 may enable an on-site user to reposition the object(s), first support structure, and/or the second support structure using the robotics system 114.

Each of the computing devices described herein including the network 110 may include suitable logic, circuitry, interfaces, processors, and/or code that may be used for communications with the other devices within or outside the exemplary system. Several aspects of the inventive system and process are presented with reference to various apparatus and methods. These apparatus and methods are described herein and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example configurations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 2:
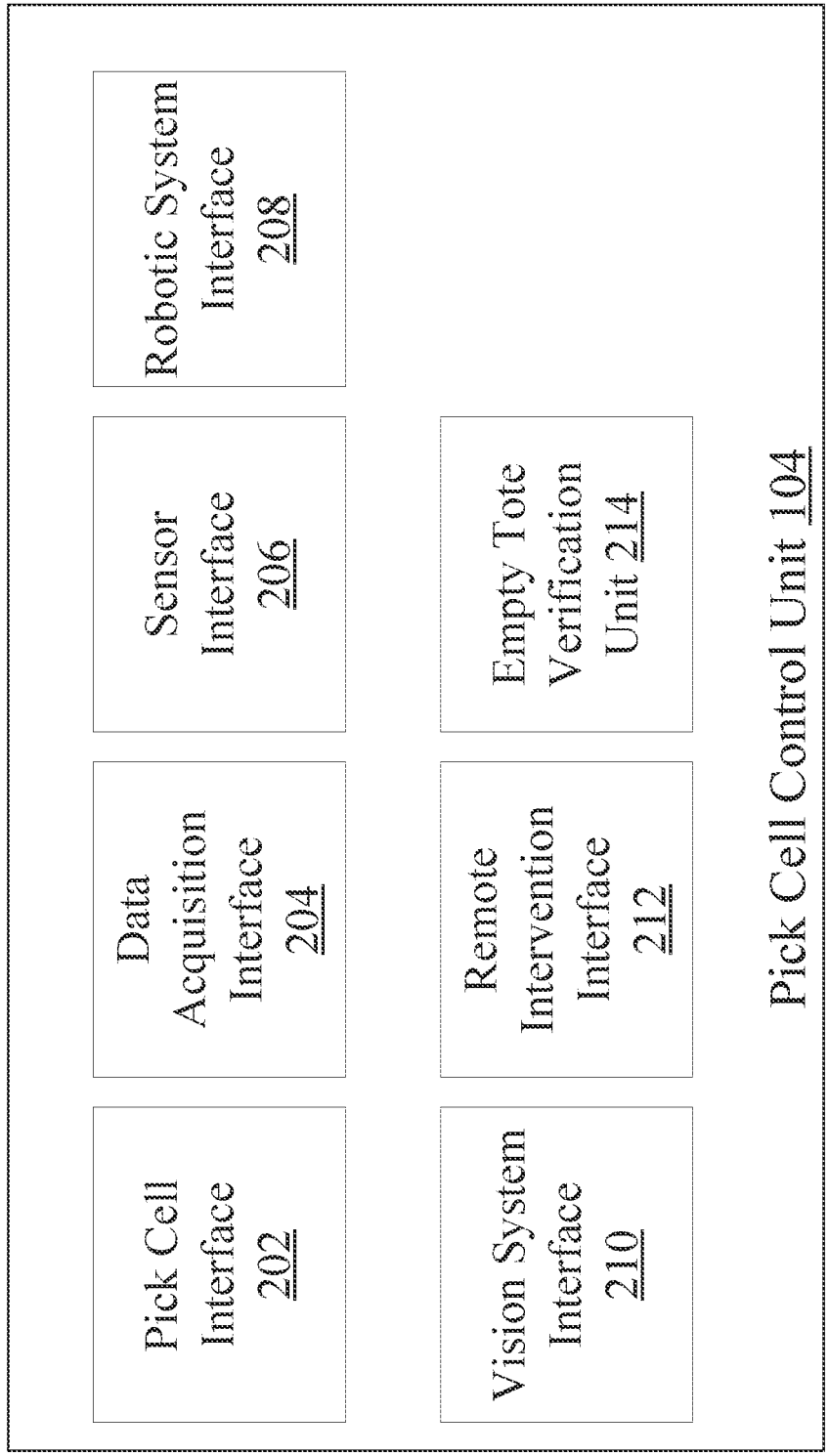
FIG. 2 is a block diagram of a pack station vision system and/or control system in accordance with an embodiment of the invention.

FIG. 2 illustrates a pick cell control unit 104, which is broadly described in reference to FIG. 1. In accordance with an embodiment of the invention, it may be comprised of a pack station interface 202, data acquisition interface 204, sensor interface 206, robotic system interface 208, vision system interface 210, and remote intervention interface 212. The various computing devices described herein in connection with FIG. 2 are exemplary and for illustration purposes only. The system may be reorganized or consolidated, as understood by a person of ordinary skill in the art, to perform the same tasks on one or more other servers or computing devices without departing from the scope of the invention.

The pick cell control unit 104 receives data from the pack station interface 202, the data acquisition interface 204, sensor interface 206, robotic system interface 208, vision system interface 210, and remote intervention interface 212 to direct the robotic system 114 as described in greater detail in reference to the process described in FIG. 3.

The pack station interface 202 interfaces with various elements of the pack station 102 to enable smooth operation. In one embodiment, the pack station interface 202 sends a command to load tote into a cell. Thereafter, it may perform an instantaneous check if the tote has been loaded. If the tote is not ready, it may wait for 5 seconds before going to suspend mode. In one embodiment, the pack station interface 202 performs instantaneous check if a box/container has been supplied by the box erector. In one embodiment, the pack station interface 202 moves an empty box (supplied by box erector) into the cell from the conveyance.

The data acquisition interface 204 interfaces with the data acquisition devices described above in reference to FIG. 1. The acquired data such as 2D data/3D data may be provided to the vision system for further analysis. In other embodiments, the acquired data may be provided to a human-in-the-loop remote reviewer who may provide pick points and/or additional feedback, which may be used for a variety of purposes, including, for example, to train ML models.

The sensor interface 206 interfaces with a variety of sensors that may be disposed in and/or around the pack station 102. A sensor may include a barcode scanner. In one embodiment, the sensor interface 206 obtains a barcode from a tote and/or a container and provides that data to the warehouse system 116 such that the warehouse system may track the various totes and/or containers as appropriate. Other sensors may be available, such as a tote-picked sensor, which identifies when a tote has been picked up by the robotic arm system. A variety of technologies may be used in the tote-picked sensor, such as a piezoelectric sensor, magnetic sensors, weight sensors, IR sensors, etc.

The robotic system interface 208 interfaces with the robotic system and provides instructions for picking/moving/placing items based on pick point and placement data that is provided by the vision system. For example, the robotic system interface 208 provides instructions to initiate suction on a robotic end effector when the end effector is placed on an item at a pick point. Thereafter, the robotic system interface 208 may provide placement instructions. The robotic end effector may release suction above the placement location to drop the item. In one embodiment, the robotic system interface 208 may turn off vacuum and pulse the puff (blow-off) outputs once all items are moved and there are no additional totes identified. In one embodiment, the robotic system interface 208 may verify that an item is picked by, for example, turning on vacuum and checking vacuum switch to verify suction. If no suction, the item may be marked as missed. In one embodiment, the robotic system interface 208 provides instructions to the robotic arm system to move out of the field of view of the data acquisition device. For example, after pick points are returned, the robotic system interface 208 provides instructions to the robotic arm system to move out of the field of view of the placing camera to enable the system to compute a place location without hindrance.

The vision system interface 210 and remote intervention interface 212 enable the system to identify pick points for one or more items in a tote. In one embodiment, pick points may be identified automatically by using AI/ML based models. Pick points along with confidence scores may be provided to the control system for picking the items. If the confidence scores are below a threshold and/or if an item is missed, then the captured data (such as 2D image data or 3D data of a tote) may be provided to a human-in-the-loop remote reviewer. The reviewer may select pick points on a graphical user interface and the remote intervention system 212 may translate those pick points to particular locations to pick items.

The empty tote verification unit 214 identifies when a tote is empty. For example, once all the items in a tote are picked, the tote may become empty. Vision systems can sometimes fail in scenarios such as when a tote is empty. In those circumstances, the empty tote verification unit 214 determines if the tote was inadvertently picked by the robotic end effector. In one embodiment, the empty tote verification unit 214 identifies a tote as being empty if (1) the vision system provides that the tote is empty, and (2) the last pick was made by a human-in-the-loop remote reviewer. In other embodiments, the empty tote verification unit 214 may obtain data from sensors identifying that the tote has moved in response to the application of suction. In such cases, the empty tote verification protocol may be executed because the robotic end effector likely picked up the tote because it is empty (i.e. there are no further items that can be picked from the tote).

FIG. 3 illustrates an exemplary process for providing vision and control support to a pack station in accordance with an embodiment of the invention. The process is comprised of initiating a pick placement 302, which may be comprised of placing a tote, pallet or another container at the pick side of the pick cell. Additionally, pick placement 302 may also be comprised of placing an empty container (or other such container) in the place side of the pick cell. This can be performed by providing instruction to move an empty box (supplied by box erector, for example) into the cell from the conveyance. A solenoid may be activated to pin the container in place. In other embodiments, the pick tote and/or the place container may arrive from a conveyance system. Sensors such as IR sensors, as well as others which would be well known to persons of ordinary skill in the art, may be used to check for new tote/container arrivals. New totes and/or containers may be placed on the pick and/or place side of the pack station if there is room available, or, if there is no room available, after the totes and/or containers that are in the pack station are removed. In one embodiment, a bar code sensor may scan barcodes on the tote and/or the container and provide the barcode and associated timestamp data to the warehouse system. The warehouse system may use the data to track efficiency/speed and/or location of one or more items as it moves through a warehouse.

The data acquisition system 304 may acquire data associated with a tote, pallet or another container that contains items. As described in greater detail in reference to FIG. 1, the acquired data may include, but is not limited to two dimensional image data, three dimensional data, sensor data, bar code data, etc.

In one embodiment, the acquired data is sent to the vision system 306 to identify pick points for picking one or more items/objects within the tote. In one embodiment, the vision system uses AI/ML models to obtain at least one pick point to pick an item within the tote. In some instances, the vision system may provide a confidence score also with the pick point data. In instances where the confidence score is below a threshold, the vision system may initiate a user intervention, wherein a remote human-in-the-loop user is provided with data acquired about a tote. The human reviewer may provide pick points in a variety of different ways, by, for example, providing picking coordinates, placing pick points on a graphical user interface, which can then be translated into location coordinates, etc.

The process thereafter determines if pick points are received 308 from the data acquisition system 304. In one embodiment, pick points may be received in the form of coordinates on a three dimensional plane. In other embodiments, pick points may be received as coordinates on a two dimensional plane, and a range on a third dimensional range. In one embodiment, the pick points may also include a confidence score, which indicates the confidence in being able to execute a successful pick if a pick is initiated at the provided pick point.

If no pick points are received, or if the confidence score received with a pick point is below a threshold, then an empty tote (or container) verification is performed 309 to determine if the container is empty. A variety of subroutines may be performed to determine if a tote is empty, including, but not limited to, human review of data captured by the data acquisition system. In one embodiment, a tote is deemed to be empty if (1) the vision system provides that the tote is empty, and (2) the last pick was made by a human-in-the-loop remote reviewer. In one embodiment, a tote is deemed to be empty if the tote itself is picked up by the robotic end effector. A variety of different mechanisms may be used to determine if a tote is picked up by the robotic end effector, including, but not limited to sensors associated with the tote which indicate whether a tote is picked or moved.

If a tote is determined to be empty, then instructions may be sent to remove the tote (i.e. placement container) 304.

If pick points are received 308, the process initiates robotic suction 310 after the robotic end effector arrives at the pick point locations (which may be a point in three dimensional space).

If suction is initiated (based on sensor and/or suction data), then the process further determines if a tote is picked 314 by the robotic system 114. A tote (or a container) may be picked when the robotic system 114 fails to suction or grab an item or a package within the container, and instead suctions or picks the entire container. If a tote is picked, then the process initiates intervention 316. A variety of different interventions may be applied, including, but not limited to, enabling a remote human-in-the-loop reviewer to intervene by, for example, providing instructions to the robotic system 114. In another embodiment, instructions may be provided to an on-site reviewer who may physically move one or more of, the tote, the container, the pick side, the place side, and/or any objects therein.

If it is determined that a tote is not picked, then the process provides placement instruction 318. Placement instruction may be comprised of instructions comprising a location for where to place the picked object including, optionally, orientation for placing the object, etc. In one embodiment, after the robot picks an item from the tote, the process sends instructions to the robotic arm system to move out of the field of view of the placement camera. Once the robotic arm system is out of the field of view of the placement camera, then a placement location may be computed. Like the pick points described above, placement points may be comprised of coordinates on a three dimensional plane. In one embodiment, placement points may be comprised of coordinates on a two dimensional plane. In other embodiments, placement points may be received as coordinates on a two dimensional plane, and a range on a third dimensional range. In one embodiment, the placement points may also include a confidence score, which indicates the confidence in being able to successfully place an item at the placement point. In one embodiment, the robotic arm system is provided the placement points, wherein the robotic end effector releases suction once it arrives at the placement point, which enables the item to fall down to or be placed in the placement container at or around the placement point.

Thereafter, a place verification process may be triggered 320 to determine whether the picked object has in fact been placed in accordance with instructions. A variety of different place verification routines may be utilized, as would be apparent to a person of ordinary skill in the art, including, but not limited to data capture and analysis by the data acquisition system and/or human review by the remote intervention system and/or human review by an on-site reviewer.

A next pick is triggered 322 thereafter, the process for which is similar to the process described in reference to element 306, and incorporated by reference herein. As described above, the process generally continues until the tote is empty, at which point, the tote may be removed from the pack cell and new totes may take its place.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
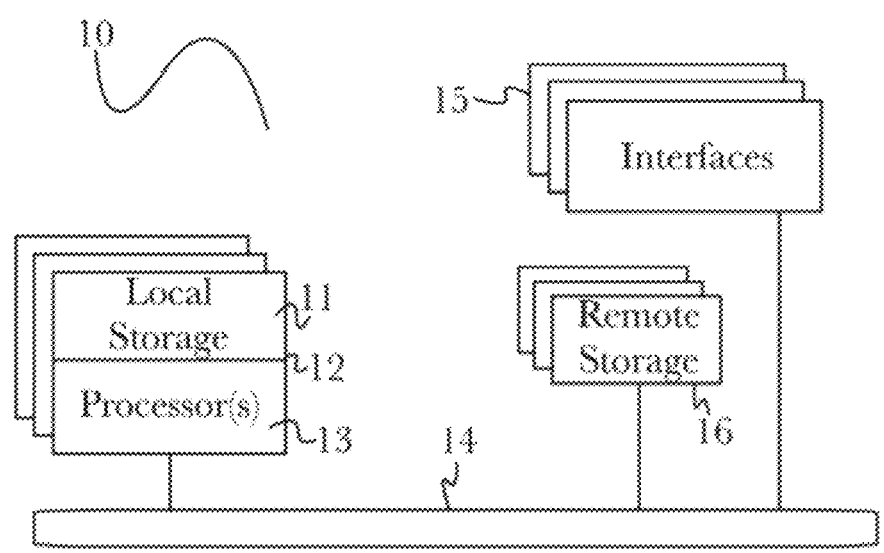
FIG. 4 illustrates one embodiment of components of an example machine able to read instructions from a machine-readable medium and execute them in a processor (or controller) in accordance with certain aspects of the disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
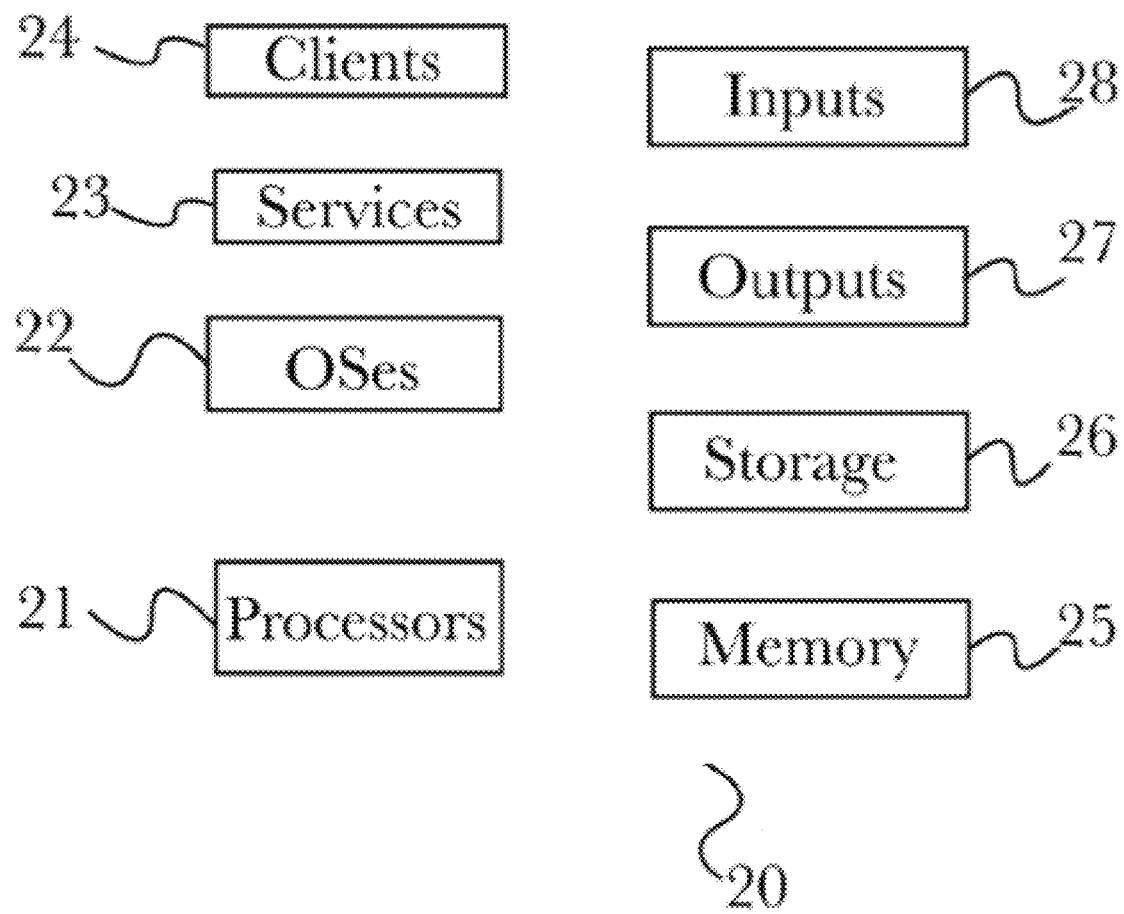
FIG. 5 illustrates an embodiment of the computing architecture that supports an embodiment in accordance with certain aspects of the disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 6:
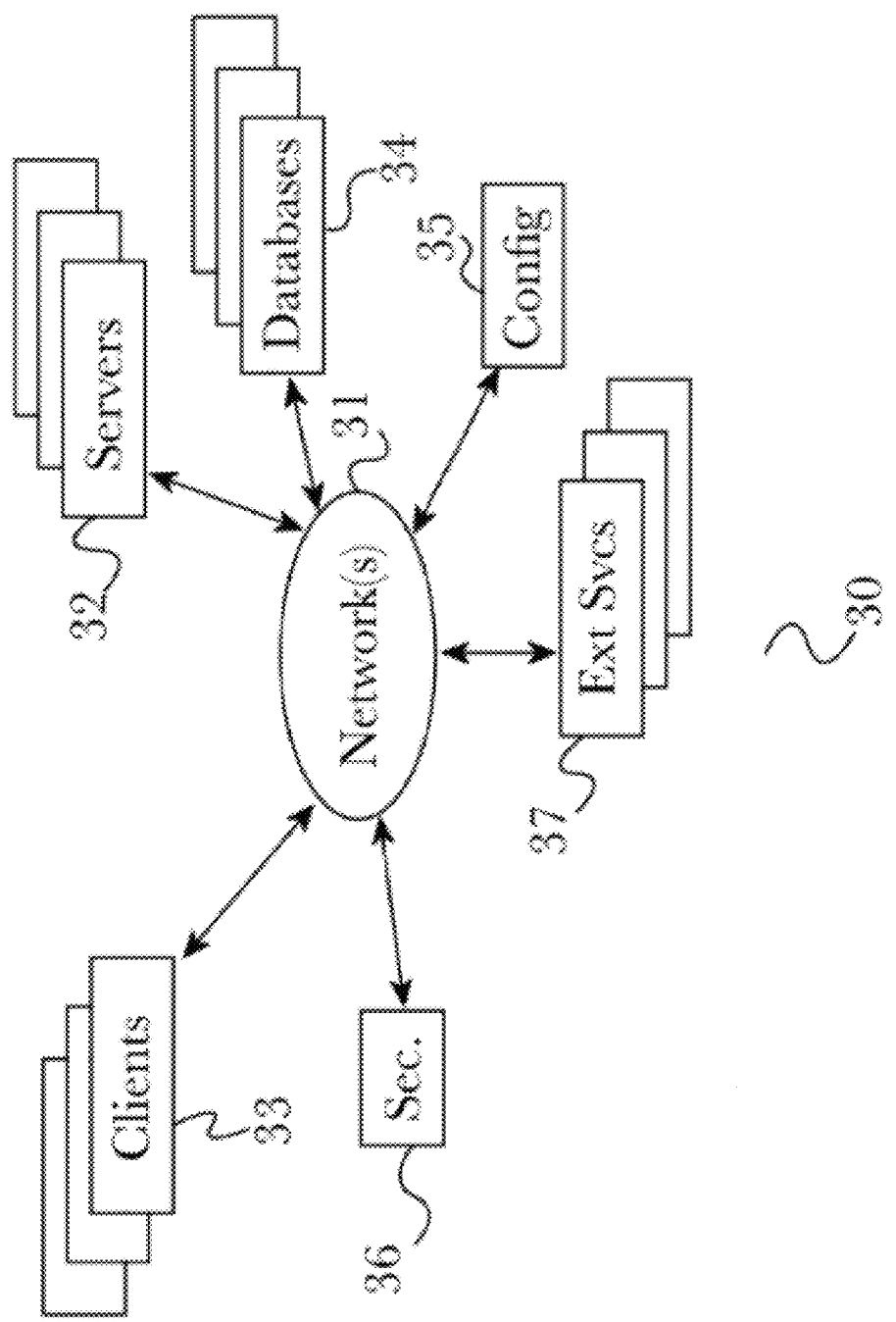
FIG. 6 illustrates components of a system architecture that supports an embodiment in accordance with certain aspects of the disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
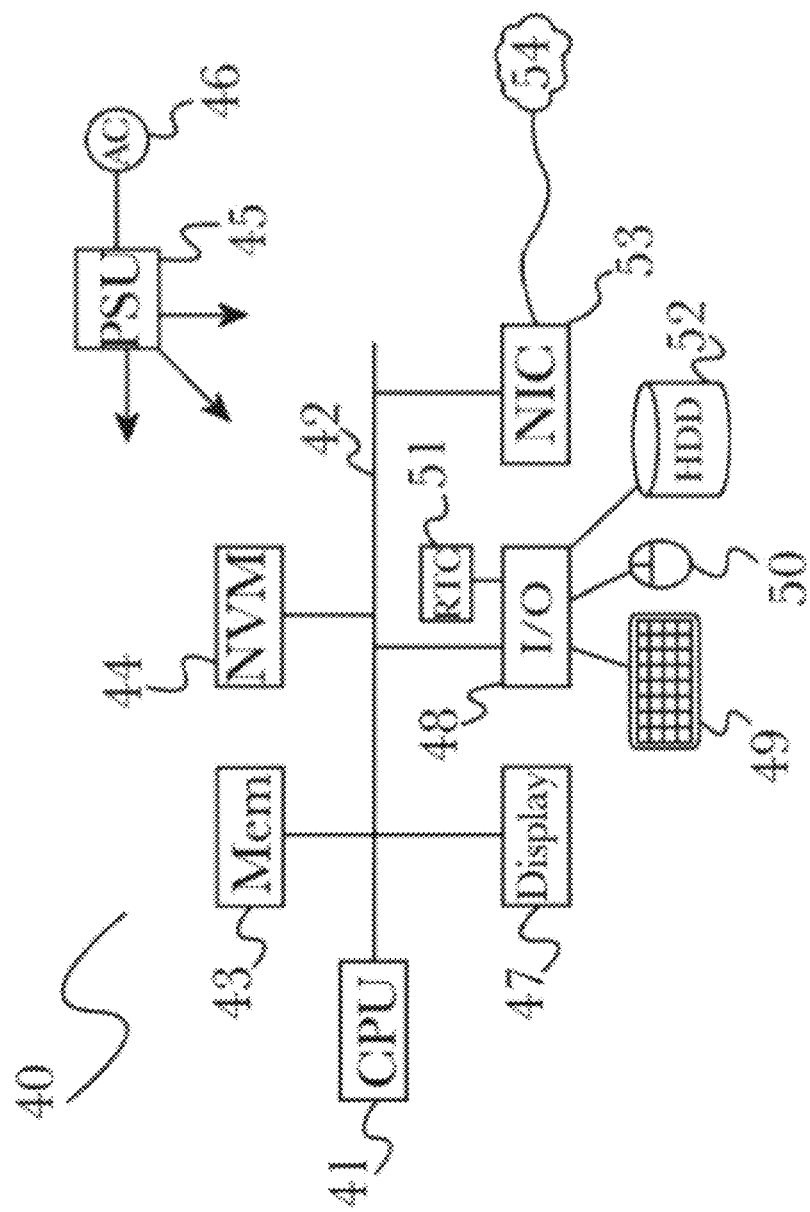
FIG. 7 illustrates components of a computing device that supports an embodiment in accordance with certain aspects of the disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for providing instructions to a robotic arm system in a work cell of a pack station, the instructions enabling the robotic arm to transfer items from a tote to a container, the computer implemented method comprising:
   receiving an electronic signal associated with data acquisition system, the electronic signal identifying at least one of the tote, the container, and the items;
   sending a signal to the vision system to trigger a first pick, the first pick identifying at least one item in the tote and at least one pick point associated with the identified item in the tote, the pick point enabling at least a portion of the robotic arm system to at least one of pick and move the item;
   obtaining first pick trigger result data from the vision system;
   analyzing the first pick trigger result data;
   providing first pick instructions to the robotic arm, the first pick instructions enabling the robotic arm system to at least one of pick and move the item associated with the first pick trigger result data;
   providing first place instruction to the robotic arm system, the first place instructions identifying a location for placing the item associated with the pick trigger result data; and
   verifying first placement;
   wherein analyzing the first pick trigger result data is comprised of:
   determining whether pick points are returned; and
   performing an empty tote verification if no pick points are returned;
      wherein the empty tote verification is performed by determining whether the last pick was performed via remote user intervention and sensor data associated with the tote, wherein the tote is verified to be empty if the last pick was performed by a remote user intervention, and if sensor data provides that the tote moved during the picking process.

2. The computer implemented method of claim 1, further comprising sending a signal to the vision system to trigger a next pick after verifying first placement.

3. The computer implemented method of claim 1, further comprising:
   sending a signal to the vision system to trigger a next pick, the next pick identifying at least one item in the tote and at least one pick point associated with the identified item in the tote, the pick point enabling at least a portion of the robotic arm system to at least one of pick and move the item;
   obtaining next pick trigger result data from the vision system;
   analyzing the next pick trigger result data;
   providing next pick instructions to the robotic arm, the next pick instructions enabling the robotic arm system to at least one of pick and move the item associated with the next pick trigger result data;
   providing next place instruction to the robotic arm system, the next place instructions identifying a location for placing the item associated with the pick trigger result data; and
   verifying the next placement.

4. The computer implemented method of claim 1, further comprising sending instructions to a work cell to load tote into the work cell.

5. The computer implemented method of claim 1, further comprising sending instructions to the work cell to move an empty container into the workcell from conveyance.

6. The computer implemented method of claim 1, further comprising sending instructions to a barcode scanner to scan a barcode on the container.

7. The computer implemented method of claim 1, wherein the signal to the vision system to trigger a first pick causes the vision system to automatically identify pick points by applying a machine learned model.

8. The computer implemented method of claim 1, further comprising sending instructions to the robotic arm system to move out of the field of view of the pick camera after pick points are received from the vision system.

9. The computer implemented method of claim 1, further comprising sending a signal to the vision system to trigger a second pick causing the vision system to provide data to a human reviewer for obtaining second pick point data.

10. A non-transitory computer readable storage medium storing instructions that, when executed by at least one processor of a computing system, causes the computing system to:
   send a signal to the vision system to trigger a first pick, the first pick identifying at least one item in the tote and at least one pick point associated with the identified item in the tote, the pick point enabling at least a portion of the robotic arm system to at least one of pick and move the item;
   obtain first pick trigger result data from the vision system;
   analyze the first pick trigger result data;
   provide first pick instructions to the robotic arm, the first pick instructions enabling the robotic arm system to at least one of pick and move the item associated with the first pick trigger result data;
   provide first place instruction to the robotic arm system, the first place instructions identifying a location for placing the item associated with the pick trigger result data; and
   verify first placement;
   wherein analyze the first pick trigger result data is comprised of:
   determine whether pick points are returned; and
   perform an empty tote verification if no pick points are returned;
      wherein the empty tote verification is performed by determining whether the last pick was performed via remote user intervention and sensor data associated with the tote, wherein the tote is verified to be empty if the last pick was performed by a remote user intervention, and if sensor data provides that the tote moved during the picking process.

11. The non-transitory computer readable storage medium of claim 10, further comprising instructions for:

sending a signal to the vision system to trigger a next pick, the next pick identifying at least one item in the tote and at least one pick point associated with the identified item in the tote, the pick point enabling at least a portion of the robotic arm system to at least one of pick and move the item;

obtaining next pick trigger result data from the vision system;

analyzing the next pick trigger result data;

providing next pick instructions to the robotic arm, the next pick instructions enabling the robotic arm system to at least one of pick and move the item associated with the next pick trigger result data;

providing next place instruction to the robotic arm system, the next place instructions identifying a location for placing the item associated with the pick trigger result data; and verifying the next placement.

12. The non-transitory computer readable storage medium of claim 10, further comprising instructions for sending a signal to the vision system to trigger a second pick causing the vision system to provide data to a human reviewer for obtaining second pick point data.

13. A system for providing instructions to a robotic arm system in a work cell of a pack station, the instructions enabling the robotic arm system to transfer items from a tote to a container, the system comprising:

a work cell that houses and retains the robotic arm system, wherein the robotic arm system comprises an end effector attached to a robotic arm;

a packing tote system that is configured to retain a tote;

a pack platform for retaining containers to be packed and for moving boxes that have been packed by the robotic pack station;

a data acquisition system that captures data associated with at least one of the tote, the container, and the items; and a computer having a processor, memory, and access to computer readable media;

a computer program stored on non-transitory computer readable media, configured to:

send a signal to the vision system to trigger a first pick, the first pick identifying at least one item in the tote and at least one pick point associated with the identified item in the tote, the pick point enabling at least a portion of the robotic arm system to at least one of pick and move the item;

obtain first pick trigger result data from the vision system;

analyze the first pick trigger result data;

provide first pick instructions to the robotic arm, the first pick instructions enabling the robotic arm system to at least one of pick and move the item associated with the first pick trigger result data;

provide first place instruction to the robotic arm system, the first place instructions identifying a location for placing the item associated with the pick trigger result data; and verify first placement;

wherein analyze the first pick trigger result data is comprised of:

determine whether pick points are returned; and perform an empty tote verification if no pick points are returned;

wherein the empty tote verification is performed by determining whether the last pick was performed via remote user intervention and sensor data associated with the tote, wherein the tote is verified to be empty if the last pick was performed by a remote user intervention, and if sensor data provides that the tote moved during the picking process.

14. The system of claim 13, further comprising a barcode scanner aligned to read a barcode contained on the tote.

* * * * *